United States Patent [19]

Yanagawa et al.

[11] Patent Number: 5,301,252
[45] Date of Patent: Apr. 5, 1994

[54] MODE FIELD CONVERSION FIBER COMPONENT

[75] Inventors: Hisaharu Yanagawa; Hirokazu Hayakawa, both of Tokyo, Japan

[73] Assignee: The Furukawa Electric Company, Ltd., Tokyo, Japan

[21] Appl. No.: 949,727

[22] Filed: Sep. 23, 1992

[30] Foreign Application Priority Data

Sep. 26, 1991 [JP] Japan .................................. 3-277194

[51] Int. Cl.$^5$ .............................................. G02B 6/26
[52] U.S. Cl. ........................................ 385/96; 385/28; 385/142
[58] Field of Search ...................... 65/1, 4.1, 4.2, 4.3; 385/28, 43, 50, 95, 96, 97, 98, 146, 141–145

[56] References Cited

U.S. PATENT DOCUMENTS 4,557,557 12/1985 Gleason et al. ...................... 385/98
4,900,114 2/1990 Mortimore et al. ................. 385/43

FOREIGN PATENT DOCUMENTS 0340042 11/1989 European Pat. Off. .
4-67106 3/1992 Japan .

OTHER PUBLICATIONS

Electronics Letters, vol. 24, No. 8, Apr. 14, 1988, pp. 500–501, Modal Field Transforming Quartz Single-Mode Fibre, S. Tammela et al.
Electronics Letters 10th Oct. 1991; vol. 27, No. 21, "Thermally-Diffused Expanded Core Fibres For Low-Loss And Inexpensive Photonic Components", pp. 1968–1969.

Primary Examiner—Rodney B. Bovernick
Assistant Examiner—John Ngo
Attorney, Agent, or Firm—Frishauf, Holtz, Goodman & Woodward

[57] ABSTRACT

The present invention provides a mode field conversion fiber component formed by fusion-connecting connection end surfaces of two optical components having different mode fields. The mode fields of the two optical components are conformed to each other at the connection end surfaces, and are continuously varied near the connection end surfaces. The present invention also provides a method for manufacturing a mode field conversion fiber component, having the steps of butting connection end surfaces of two optical fibers having different mode fields, fusion-connecting the connection end surfaces of the two optical fibers, and heating a fusion-connecting portion of the connection end surfaces, diffusing core dopant, and conforming the mode fields of the two optical fibers.

2 Claims, 2 Drawing Sheets

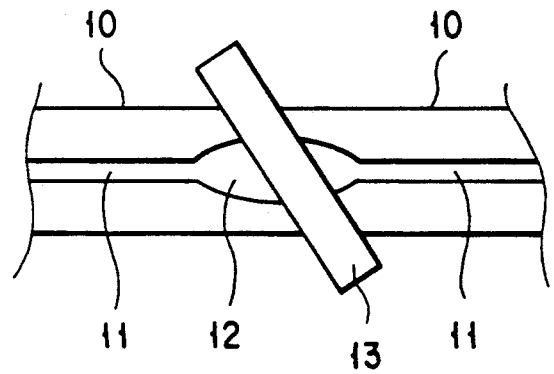
FIG. 1
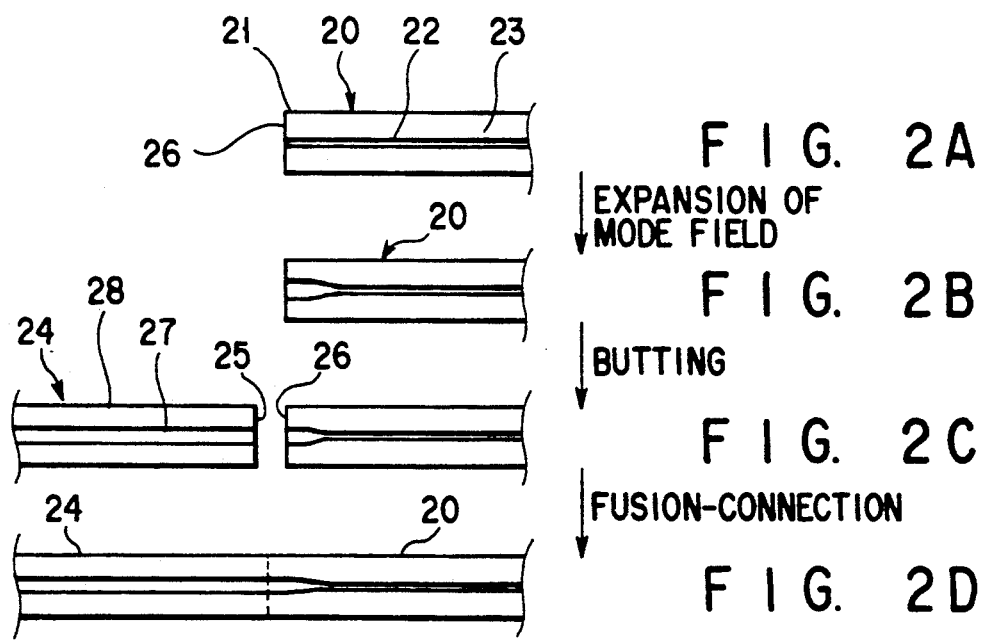
FIG. 2A
↓ EXPANSION OF MODE FIELD
FIG. 2B
↓ BUTTING
FIG. 2C
↓ FUSION-CONNECTION
FIG. 2D

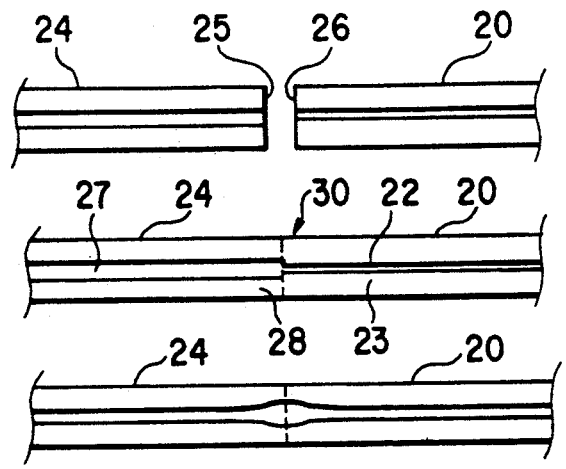
FIG. 3A
FUSION-CONNECTION
FIG. 3B
CONTINUOUS VARIATION OF MODE FIELDS
FIG. 3C
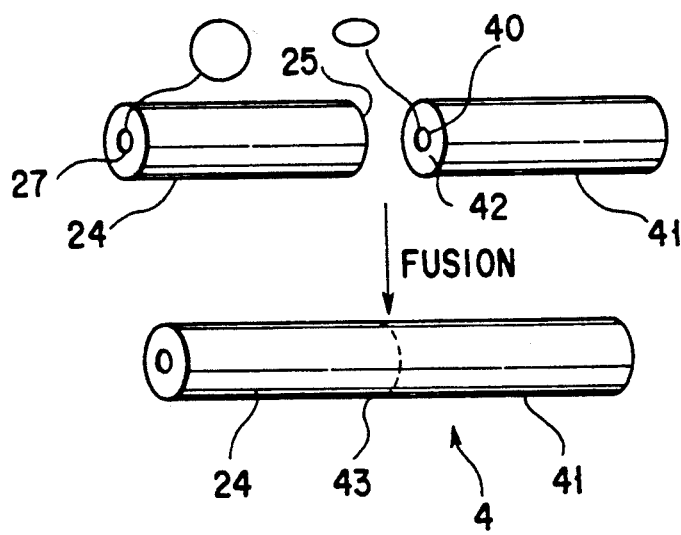
FIG. 4A
FUSION
FIG. 4B
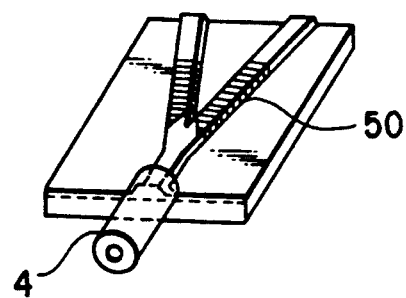
FIG. 5

MODE FIELD CONVERSION FIBER COMPONENT

BACKGROUND OF THE INVENTION

1. Field of the Invention

The present invention relates to a mode field conversion fiber component for use in optical communication and an optical sensor system.

2. Description of the Related Art

In most cases, their mode fields of optical waveguide devices and fibers do not coincide with each another. Here and also in the following, an optical device based on a planar waveguide structure is meant by the words "optical waveguide device". When an optical waveguide device is connected to a standard optical fiber used for optical communication, conventionally, a connection loss due to mode field mismatch has to be taken into consideration, or a light control member such as a lens has to be interposed between the optical waveguide device and the optical fiber to adjust the shape and/or size of their mode fields at their connection point.

SUMMARY OF THE INVENTION

It is an object of the present invention to provide a mode field conversion fiber component capable of connecting an optical fiber and an optical device which have different mode fields at a slight loss.

To attain this object, there is provided a mode field conversion fiber component formed by fusion-connecting connection end surfaces of two optical fiber having different mode fields, the mode fields of the two optical fibers being conformed to each other at the connection end surfaces, and being continuously varied near the connection end surfaces. Furthermore, the mode field of one of the two fibers is same as or similar to the mode field of an optical waveguide device at its free end, and the mode field of the other of the two fibers is the same as the mode field of a fiber to be connected to an optical waveguide device.

It is another object of the present invention to provide a method for easily manufacturing the above-described mode field conversion fiber component.

To attain this object, there is provided a method for manufacturing a mode field conversion fiber component, comprising the steps of:

heating a connection end surface of a first optical fiber whose mode field is smaller than a mode field of a second optical fiber, diffusing core dopant, expanding the mode field of the first optical fiber, and conforming the mode field of the first optical fiber to that of the second optical fiber, butting the connection end surface of the first optical fiber and a connection end surface of the second optical fiber; and fusion-connecting the connection end surfaces to each other.

To attain this object there is also provided a method for manufacturing a mode field conversion fiber component, comprising the steps of: butting connection end surface of two optical fibers having different mode field; fusion-connecting the connection end surfaces of the two optical fibers; and heating a fusion-connecting portion of the connection end surfaces, diffusing core dopant, and conforming the mode fields of the two optical fibers.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a view showing an optical component having an optical fiber integrated structure;

FIGS. 2A to 2D are are views for explaining a method for manufacturing a mode field conversion fiber component according to an embodiment of the present invention;

FIGS. 3A to 3C are views for explaining a method for manufacturing a mode field conversion fiber component according to another embodiment of the present invention;

FIGS. 4A and 4B are views for explaining a method for manufacturing a mode field conversion fiber component according to still another embodiment of the present and FIG. 5 is a view for explaining a connection between a mode field conversion fiber component and an optical waveguide device according to the present invention.

DETAILED DESCRIPTION OF THE PREFERRED EMBODIMENTS

To resolve the problem of the prior art, the inventors of the present invention have paid attention to a core-expanded fiber which is obtained by locally expanding a waveguide mode of a single-mode optical fiber formed of silica type material. The core-expanded fiber is produced by diffusing dopant contained in a core member using the TEC (thermally expanded core) technique, and is used for an optical fiber integrated structure having optical functional elements directly inserted into optical fibers.

FIG. 1 is a view showing an optical component having an optical fiber integrated structure produced using the TEC technique. In FIG. 1, reference numeral 10 indicates a single-mode optical fiber, and numeral 11 denotes a core thereof. A mode field of the core 11 is expanded by the TEC technique. An optical device 13 is inserted into the mode-field expanded portion 12 of the core 11 at a predetermined angle to an optical axis. This optical fiber integrated structure enables a diffraction loss to be reduced. The TEC technique is therefore used to expand the mode field of a single-mode optical fiber in order to reduce a diffraction loss of an optical component.

On the other hand, the present inventors have utilized that a connection loss can be reduced by conforming different mode fields of two optical fibers to each other using the TEC technique.

Embodiments of the present invention will now be described, with reference to the accompanying drawings.

EMBODIMENT 1

FIGS. 2A to 2D are views showing a method for manufacturing a mode field conversion fiber component according to the first embodiment of the present invention. In the first optical fiber 20 doped with germanium oxide, as shown in FIG. 2A, a relative refractive index $\Delta$ is 1.0%, the diameter of a core 22 is 4.5 $\mu$m, and the radius of a mode field is 2.6 $\mu$m when the wavelength is 1.3 $\mu$m. An end portion 21 of the first optical fiber 20 is heated for five hours at a temperature of 1300° C. in an electric furnace, and dopant of the core 22 is diffused into a clad 23, thereby expanding the core 22 as shown in FIG. 2B. The radius of the mode field of the first optical fiber 20 is increased to 5.2 $\mu$m so as to conform to the mode field of the second optical fiber 24 doped with germanium oxide, as shown in FIG. 2C, in which a relative refractive index $\Delta$ is 0.25%, the diameter of a core 27 is 9 $\mu$m, and the radius of a mode field is 5.2 $\mu$m when the wavelength is 1.3 $\mu$m.

As shown in FIG. 2C, a connection end surface 25 of the second optical fiber 24 butts a connection end surface 26 of the first optical fiber 20 whose end portion has been heated, and they are fusion-connected to each other. Therefore, as shown in FIG. 2D, the first and second optical fibers are integrally formed as a mode field conversion fiber component. In FIG. 2C, reference numeral 28 indicates a clad of the second optical fiber 24.

The mode field conversion fiber component so formed has a mode field diameter of about 10 $\mu$m which can be conformed at one connection end surface to a standard optical fiber used for optical communication, and has a mode field diameter of about 5 $\mu$m which can be conformed at the other connection end surface to an optical waveguide device.

EMBODIMENT 2

FIGS. 3A to 3C are views showing a method for manufacturing a mode field conversion fiber component according to the second embodiment of the present invention. The optical fibers 20 and 24 of the second embodiment are the same as those of the first embodiment.

As shown in FIG. 3A, the connection end surface 26 of the first optical fiber 20 and the connection end surface 25 of the second optical fiber 24 are butted and fusion-connected to each other. Therefore, the first and second optical fibers are integrally formed as one component, as shown in FIG. 3B.

A connecting portion 30 of the first and second optical fibers is heated for five hours at a temperature of 1300° C. in the electric furnace to diffuse dopant of cores 22 and 27 into clads 23 and 28, respectively. These cores are expanded, and the mode fields of the first and second optical fibers are conformed to each other, resulting in a mode fiber conversion fiber component.

The mode field conversion fiber component so formed has a mode field diameter of about 10 $\mu$m which can be conformed at one connection end surface to a standard optical fiber used for optical communication, and has a mode field diameter of about 5 $\mu$m which can be conformed at the other connection end surface to an optical waveguide device.

EMBODIMENT 3

FIGS. 4A and 4B are views showing a method for manufacturing a mode field conversion fiber component according to the third embodiment of the present invention. The third embodiment includes a first optical fiber 24 whose core 27 has a circular section, and a second optical fiber 41 whose mode field is elliptic, that is, whose core 40 has an elliptic section (long diameter: 8 $\mu$m, short diameter: 6 $\mu$m).

As shown in FIG. 4A, a connection end surface 25 of the first optical fiber 24 and a connection end surface 42 of the second optical fiber 41 are butted and fusion-connected to each other. Therefore, as shown in FIG. 4B, these optical fibers are integrally formed as one component.

A connecting portion 43 of the first and second optical fibers is heated by arc discharge for 200 seconds at a 1 kV to diffuse dopant of the cores 27 and 40 into their corresponding clads. These cores are deformed at the connecting portion 43, and the mode fields of the first and second optical fibers are conformed to each other, thereby forming a mode fiber conversion fiber component 4.

The mode field conversion fiber component 4 is connected to a waveguide type optical switch 50 of a planar light wave circuit whose mode field has elliptic section (long diameter: 8 $\mu$m, short diameter: 6 $\mu$m), as shown in FIG. 5. It has been confirmed that the component 4 and the switch 50 can be connected at a slight connection loss.

As described above, the mode field conversion fiber component of the present invention can be formed by connecting two optical fibers having different mode fields or shapes with a low connection loss.

In the mode field conversion fiber component of the present invention, an excess loss due to the conversion of the mode fields can be reduced since the mode fields are continuously varied at the connecting portion of the optical fibers. Using the mode field conversion fiber component of the present invention, an optical waveguide device and fiber having different mode fields can be easily connected to each other without using a lens or the like and without a high connection loss.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents

What is claimed is:

1. A mode field conversion fiber component comprising:
    a connection end surface of a first optical fiber, having a mode field that is one of the same and similar to a mode field of an optical device which is connected to the first optical fiber, said connecting end surface of said first optical fiber being fusion connected to a connection end surface of a second optical fiber having a different mode field than the first optical fiber, to form an interface between said first and second optical fibers;
    each of said first and second optical fibers having a core surrounded by a cladding; and
    the cladding of each optical fiber near said interface containing an amount of dopant therein obtained from a dopant in the respective core, such that said mode fields of said first and second optical fibers are continuously varied by said dopant near said interface so that said mode fields of said first and second optical fibers conform with each other at said interface.

2. A mode field conversion fiber component comprising:

a connection end surface of a first optical fiber, having a mode field that is one of the same and similar to a mode field of an optical device which is connected to the first optical fiber, said connector end surface of said first optical fiber being fusion connected to a connection end surface of a second optical fiber having a different mode field than the first optical fiber, to form an interface between said first and second optical fibers;

each of said first and second optical fibers having a core surrounded by a cladding; and the cladding of each optical fiber near said interface containing an amount of dopant therein obtained from a dopant in the respective core, such that said mode fields of said first and second optical fibers are continuously varied by said dopant near said interface so that said mode fields of said first and second optical fibers conform with each other at said interface; and wherein:

the mode fields of the first and second optical fibers respectively have a circular and an elliptical cross-section.

* * * * *